Oct. 21, 1924.
E. ROSENTHAL
SEED POTATO CUTTER
Filed June 4, 1924
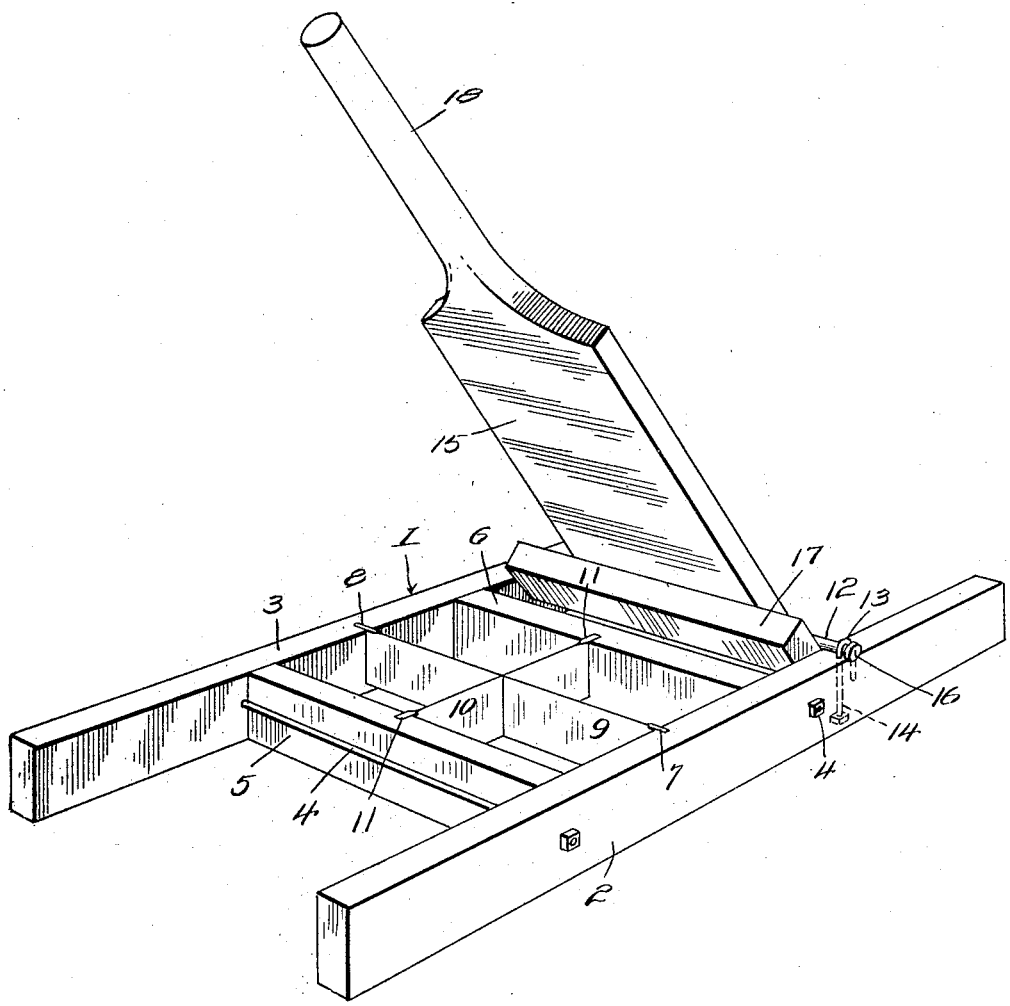
Inventor
Ernest Rosenthal.
By Clarence A. O'Brien.
Attorney Patented Oct. 21, 1924.

1,512,055

UNITED STATES PATENT OFFICE.

ERNEST ROSENTHAL, OF HAMBURG, IOWA.

SEED-POTATO CUTTER.

Application filed June 4, 1924. Serial No. 717,764.

*To all whom it may concern:*

Be it known that I, ERNEST ROSENTHAL, a citizen of the United States, residing at Hamburg, in the county of Fremont and State of Iowa, have invented certain new and useful Improvements in Seed-Potato Cutters, of which the following is a specification.

This invention relates to new and useful improvements in seed potato cutters, and has for its principal object to provide a simple and efficient means for cutting potatoes, which are to be used for planting purposes.

Another important object of the invention is to provide a seed potato cutter of the above mentioned character, wherein a swinging lever is employed for bringing the potato into engagement with the cutting edges of the knife, whereby the potato may be cut up into predetermined portions.

A further object of the invention is to provide a seed potato cutter of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

The figure represents a perspective view of my improved seed potato cutter.

In the drawing, wherein for the purpose of illustration is shown the preferred embodiment of my invention, the numeral 1 designates generally the frame of my improved seed potato cutter, and the same comprises the longitudinally extending spaced side members 2 and 3 respectively. Extending transversely between the side members and secured thereto by means of the securing bolts 4, are the transversely extending cross bars 5 and 6 respectively. These cross bars are preferably arranged in the intermediate portions of the side members and are spaced from each other in the manner as clearly illustrated in the drawing.

Supported in suitable recesses 7 and 8 respectively, provided in the inner opposed faces of the side members, and spaced equidistant from the cross bars 5 and 6 respectively, is a transversely extending cutter knife or blade 9. A longitudinally extending cutter blade 10 has its ends supported in suitable recesses 11 provided on the inner opposed faces of the cross bars, intermediate the ends thereof, and the longitudinally extending cutter blade 10 is adapted to intersect the transversely extending cutter blades, in any suitable manner, such as is well known in the art.

The cutting edges of the transversely and longitudinally mounted cutter blades, are in substantially the same plane as the upper faces of the side members and the cross bars respectively.

Pivotally supported between the side members 2 and 3 respectively, and adjacent one of the cross bars, by means of the transversely extending rod 12, the ends of which are supported in the looped portion 13 of suitable bolts 14, which extend upwardly through the side members, is the swinging levers 15. The ends of the rods 12 are provided with enlarged heads for preventing the displacement of the same, from engagement with the portion 13 of the bolt 14. A block 17 is carried by the pivoted end of the lever 15 and is adapted for swinging movement between the side members and the cross bar 6, in the manner as is obvious from the construction as shown in the drawing. This block 17 will prevent any lateral movement of the pivoted end of the lever 15 between the side members.

The lever 15 is of a suitable width and terminates at its forward end in the reduced portion 18, whereby a handle is provided, for actuating the same, in the manner to be presently described.

In operation, a potato is placed on the stationary frame 1, in such a manner as to rest on the cutting edges of the cutting knives 9 and 10 respectively, and the free end of the lever 15 is then actuated to cause the lever 15 to engage the potato and move the same into engagement with the cutting edges of the knives, whereby the knives will pass through the potato cutting the same up, into predetermined portions, and in the present instance, the knives are so arranged as to quarter the potatoes. The cut portions of the potatoes will pass through the openings formed by the arrangement of the cutter blades, and may then be planted in the ground.

It will thus be seen from the foregoing description that a seed potato cutter has been provided, which is simple in construction, inexpensive, strong and durable, and further so constructed as to enable the parts to be readily moved into an operative or inoperative position. Considerable time and labor will be saved in cutting seed potatoes for planting purposes, by using a device of the character above described, and the potato cutter will furthermore be positive and efficient in its use.

While I have shown the preferred embodiment of my invention, it is to be understood that various changes in the size, shape and arrangement of parts may be resorted to, without departing from the spirit of the invention and the scope of the appended claim.

Having thus described my invention, what I claim is:

A potato cutter comprising parallelopiped side members, parallelopiped cross bars interposed between the side members and holding the side members in parallel relation, the upper edges of the side members and the cross bars lying in the same plane, the said side members and cross bars being provided at their inner sides with recesses, knife blades arranged in cruciform relation and having their end portions received in the recesses, a rod disposed transversely across the side members and bridging the space between them, U-bolts passing through the side members and engaging over the end portions of the rod, a lever pivoted upon the intermediate portion of the rod and adapted to swing over the knife blade and a block fixed to the lever and having its ends in close proximity with the inner surfaces of the side members and adapted to lie between the side members and beyond the cross bars when the lever is disposed toward the knife blade.

In testimony whereof I affix my signature.

ERNEST ROSENTHAL.